(12) United States Patent
Manakkal

(10) Patent No.: US 7,259,684 B1
(45) Date of Patent: Aug. 21, 2007

(54) DEVICE AND METHOD FOR EXTENDING THE LIFETIME OF A BATTERY IN A TIRE PRESSURE SENSOR

(75) Inventor: Raj Manakkal, Marysville, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/780,210

(22) Filed: Feb. 17, 2004

Related U.S. Application Data

(62) Division of application No. 10/141,136, filed on May 9, 2002, now Pat. No. 6,693,547.

(51) Int. Cl.
*G08B 21/00* (2006.01)
(52) U.S. Cl. ............... 340/636.2; 340/442; 340/636.1; 73/146.8
(58) Field of Classification Search ............... 340/442, 340/447, 636.1; 73/146.8
See application file for complete search history.

(56) References Cited

U.S. PATENT DOCUMENTS

| | | | |
|---|---|---|---|
| 4,569,363 A | 2/1986 | Kleeman | |
| 4,998,092 A | 3/1991 | Ohno et al. | |
| 5,540,092 A | 7/1996 | Handfield et al. | |
| 5,987,980 A | 11/1999 | Mangafas et al. | |
| 6,101,870 A * | 8/2000 | Kato et al. | 73/146.8 |
| 6,194,998 B1 * | 2/2001 | Huang | 340/442 |
| 6,693,547 B1 * | 2/2004 | Manakkal | 340/636.1 |

OTHER PUBLICATIONS

SMARTIRE, "Technology", web page at http://www.smartire.com/fl/na/technology/accessed Feb. 7, 2002.

* cited by examiner

*Primary Examiner*—Julie Lieu
(74) *Attorney, Agent, or Firm*—Ditthavong Mori & Steiner, P.C.

(57) ABSTRACT

A device and method for extending the lifetime of a battery of a tire pressure sensor disposed in a tire are described, in which the battery can be recharged through the valve stem of the tire. The device includes an electrical power source and an electrode adapted to be coupled to the valve stem and supply power from the electrical power source to the valve stem.

8 Claims, 5 Drawing Sheets

DEVICE AND METHOD FOR EXTENDING THE LIFETIME OF A BATTERY IN A TIRE PRESSURE SENSOR

The present application is a divisional of U.S. patent application Ser. No. 10/141,136 filed on May 9, 2002 now U.S. Pat. No. 6,693,547, the contents of which are hereby incorporated by reference.

FIELD OF THE INVENTION

The present invention generally relates to tire pressure sensors and more particularly to extending the lifetime of a battery of a tire pressure sensor disposed in a tire.

DISCUSSION OF THE BACKGROUND

Various types of tire pressure sensors have been developed that are situated within tires of vehicles (see, e.g., U.S. Pat. Nos. 5,540,092 and 5,987,980). These tire pressure sensors require electrical power to monitor and transmit information regarding the current tire pressure for display in the passenger compartment of the vehicle. Typically, the tire pressure sensors are powered by long-life batteries also disposed within the tires. The lifetime of these long-life batteries, however, is five to ten years, which is less than the life span of many automobiles and trucks. The effective lifetime of these batteries may be even shorter, because it is not desirable to run the battery down to such an extent that the tire pressure sensor system fails before the battery is replaced. Furthermore, replacing a tire pressure sensor battery is a labor-intensive process, involving, e.g., the removal of the tire from the wheel.

Accordingly, some tire pressure systems attempt to extend the life of the battery by providing a centrifugal switch disposed between the tire pressure sensor and the battery. This centrifugal switch is activated only when the tires rotate beyond a certain rate. As a result, the battery is used for monitoring tire pressure only when the vehicle is in motion. Another approach to extend the life of the battery is to limit the transmission of the tire pressure information only to certain conditions, for example, if there is a drop in tire pressure or if the tire pressure information is requested by the driver.

These approaches, however, are difficult to model statistically and therefore guarantee a reliable battery lifetime that is commensurate with the life span of the vehicle under a wide range of uses. For example, vehicles in interstate trucking are in motion to a much greater extent than pleasure or commuting vehicles.

Another problem with these approaches is that the usefulness of the tire pressure sensor is curtailed. For example, when the centrifugal switch is used, the tire pressure can only be sensed when the vehicle is in motion. As another example, when the transmission of tire pressure information is limited to certain, rare conditions, the driver of the vehicle cannot be provided with real-time information on the pressure of the vehicle's tires.

Therefore, there is a need for extending the life of a battery of a tire pressure sensor and for avoid the necessity of replacing a tire pressure sensor battery. There is also need for making tire pressures useful in more situations, e.g. when the vehicle is standing still.

SUMMARY OF THE INVENTION

These and other needs are addressed by the present invention, in which the tire pressure sensor battery is recharged through the tire valve. For example, a recharging device may be shaped so that the device would mate with the tire valve and, when activated, cause a rechargeable battery in the tire pressure sensor to be recharged. The recharging device can be used by dealers and mechanics at regular service intervals to ensure that the tire sensor battery is recharged. Advantageously, the effective life of the battery is extended each time the battery is recharged and without having to remove the tire. The ability to recharge the battery through the value stem renders the use of the centrifugal switch optional, thereby permitting the tire pressure to measured even if the vehicle is standing still.

Accordingly, one aspect of the present invention pertains to a device for charging a battery of a tire pressure sensor within a tire. The device includes an electrical power source and an electrode adapted to be coupled to a valve stem of the tire and configured to supply power from the electrical power source to the valve stem for charging the battery. In one embodiment, the device also includes a switch configured for selectively supplying power from the electrical power source to the electrode for charging the battery.

Another aspect relates to a method for charging a battery of a tire pressure sensor disposed in a tire, in which an electrode is applied to a valve stem of the tire and electrical power is supplied to the electrode for charging the battery. In one embodiment, the electrode is disposed upon a device that also has a switch. When the switch in a first position, the electrode can be applied to a valve stem of the tire for reading an indication of a life of the battery, and when the switch in a second position, the electrode can be applied to a valve stem of the tire for supplying electrical power to the electrode for charging the battery.

Still another aspect of the present invention pertains to a tire pressure sensor system, comprising a tire pressure sensor, a rechargeable battery coupled to the tire pressure sensor, and a valve stem assembly that has a pair of electrodes. The electrodes are coupled to the rechargeable battery for accepting electrical power for recharging the rechargeable battery. In one implementation, one of the electrodes is adapted to be coupled to a plunger of a valve stem, and the other of the electrodes is adapted to be coupled to a threaded connector of the valve stem. The tire pressure sensor system may also comprise a centrifugal switch coupled to the tire pressure sensor, in which the electrodes are coupled between the centrifugal switch and the rechargeable battery.

To replace a valve stem in yet another aspect of the present invention, an electrode of the valve stem is disconnected from a lead coupled to a terminal of the battery. The valve stem is replaced, and an electrode of the replaced valve stem is connected with the lead coupled to a terminal of the battery.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A device and method for extending the lifetime of a battery of a tire pressure sensor disposed in a tire are described. In the following description, for purposes of explanation, numerous specific details are set forth in order to provide a thorough understanding of the present invention. It is apparent to one skilled in the art, however, that the present invention may be practiced without these specific details or with an equivalent arrangement. In some instances, well-known structures and devices are shown in block diagram form in order to avoid unnecessarily obscuring the present invention.

Figure 1:
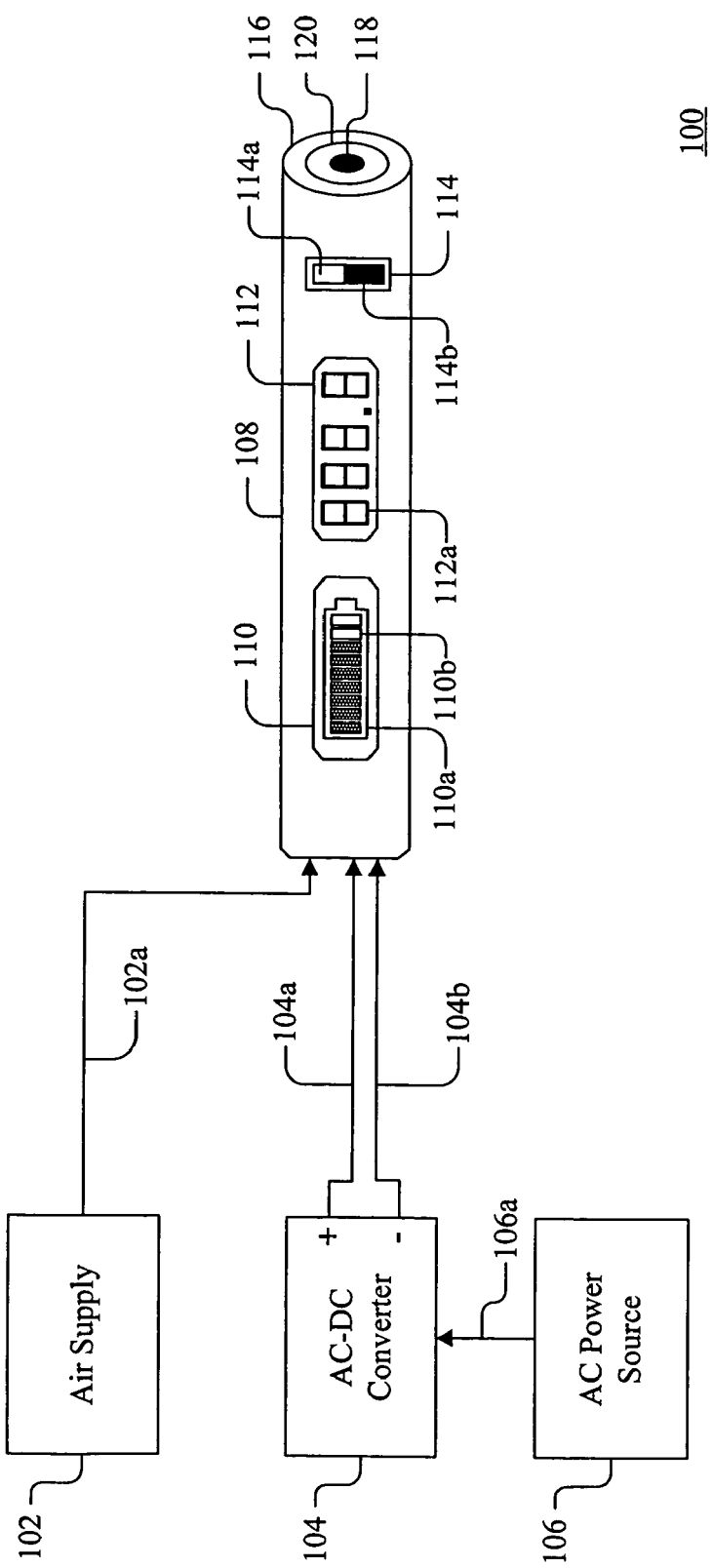
FIG. 1 is a diagram illustrating an exemplary tire pressure sensor battery charging device according to an embodiment of the present invention.

Referring to FIG. 1, a tire pressure sensor battery charging system 100 includes a charging device 108 that is coupled to an electric power source, such as an alternating current-direct current (AC-DC) converter 104. In one embodiment, the AC-DC converter 104 receives an AC input from an AC power source 106 by a power line 106a, such as an 110-volt wall socket, and converts the AC input into a DC output signal for the charging device 108 via DC signal lines 104a and 104b.

In some embodiments, the charging device 108 is also supplied with air from an air supply 102 over an air supply hose 102a. Accordingly, the charging device 108 can also supply air to a valve stem connected thereto via air supply input/output 120.

The charging device 108 may include a battery charge display 110, a tire pressure display 112 and a TEST/CHARGE switch 114. The DC signal from the DC signal lines 104a and 104b can be selectively provided to corresponding electrodes 118 and 116 of the charging device 108 based on a setting of the TEST/CHARGE switch 114. When the TEST/CHARGE switch 114 is set in a CHARGE position 114b, the DC signal from the signal lines 104a and 104b are provided to the corresponding electrodes 118 and 116. When the TEST/CHARGE switch 114 is placed in a TEST position 114a, on the other hand, an indication of the remaining charge on the tire pressure sensor battery is displayed on the battery charge display 110 based on a measurement at the electrodes 118 and 116 of an electrical parameter such as voltage or current. The tire pressure of the tire appearing on the air supply nozzle 120 may also be displayed on the tire pressure display 112. The electrodes 118 and 116 are adapted within the air supply nozzle 120 to be electrically and mechanically coupled to a valve stem of tire. The charging device 108 may be shaped similar to that of existing tire pressure gauges.

In one embodiment, the battery charge display 110 includes an image 110a of a battery and a bar graph 10b, which indicates a relative amount of life remaining in tire pressure sensor battery in sequence of lit bars. The tire pressure display 112 includes a seven-segment display 112a for showing the tire pressure in suitable units, such as pounds per square inch (PSI). In other embodiments, different representations, e.g. with digital numerals or analog indicia, may be employed.

Figure 2:
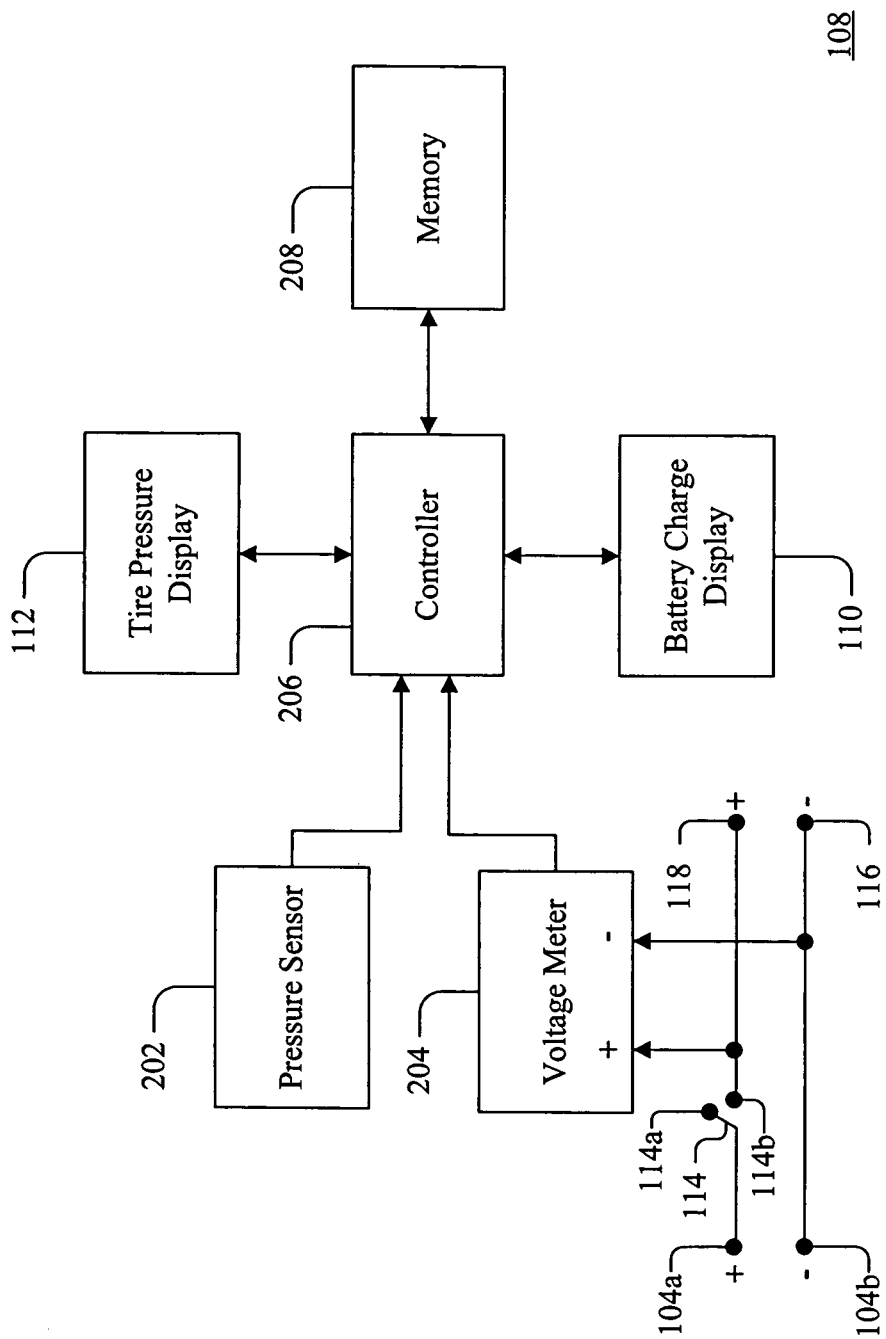
FIG. 2 is block diagram illustrating the tire pressure sensor battery charging device of FIG. 1 according to an embodiment of the present invention.

FIG. 2 is block diagram illustrating one implementation of the tire pressure sensor battery charging device 108 of FIG. 1. In FIG. 2, the charging device 108 includes a controller 206 coupled to a memory 208, the battery charge display 110, the tire pressure display 112, a pressure sensor 202, and a voltmeter 204.

The inputs of the voltage meter 204 may be coupled, for example, to the electrodes 118 and 116 for measuring a voltage appearing across the electrodes 118 and 116 when the switch TEST/CHARGE 114 is in the TEST position 114a. When the TEST/CHARGE switch 114 is in the CHARGE position 114b, on the other hand, the power source from the DC signal lines 104a and 104b are provided to electrodes 118 and 116. The voltage measured by the voltmeter 204 is provided to the controller 206 for appropriate processing and, if necessary, conversion and for display on the battery charge display 110. Alternatively, other kinds of meters may be used to measure the remaining life of the battery based a measured electrical parameter, e.g. an ammeter for measuring a current drawn from the electrodes 118 and 116.

The pressure sensor 202 measures an air pressure at the air supply nozzle 120. The air pressure measured by the pressure sensor 202 is also provided to the controller 206 for appropriate conversion, if necessary, and for displaying on the tire pressure display 112.

The controller 206 may be implemented in various ways, for example, by one or more microprocessors, digital signal processors, controllers, and micro-controllers controlled by computer software. The memory 208 may include a combination of one or more of the following: dynamic RAM (DRAM), static RAM (SRAM), synchronous DRAM (SDRAM), read only memory (ROM), programmable ROM (PROM), erasable PROM (EPROM), electrically erasable PROM (EEPROM), flash memory, etc., for storing information and instructions to be executed by the controller 206 and temporary variables or other intermediate information during the execution of instructions by the controller 206. The display devices 112 and 110 may include, for example, liquid crystal displays (LCD), or light-emitting diode (LED) displays.

Figure 3:
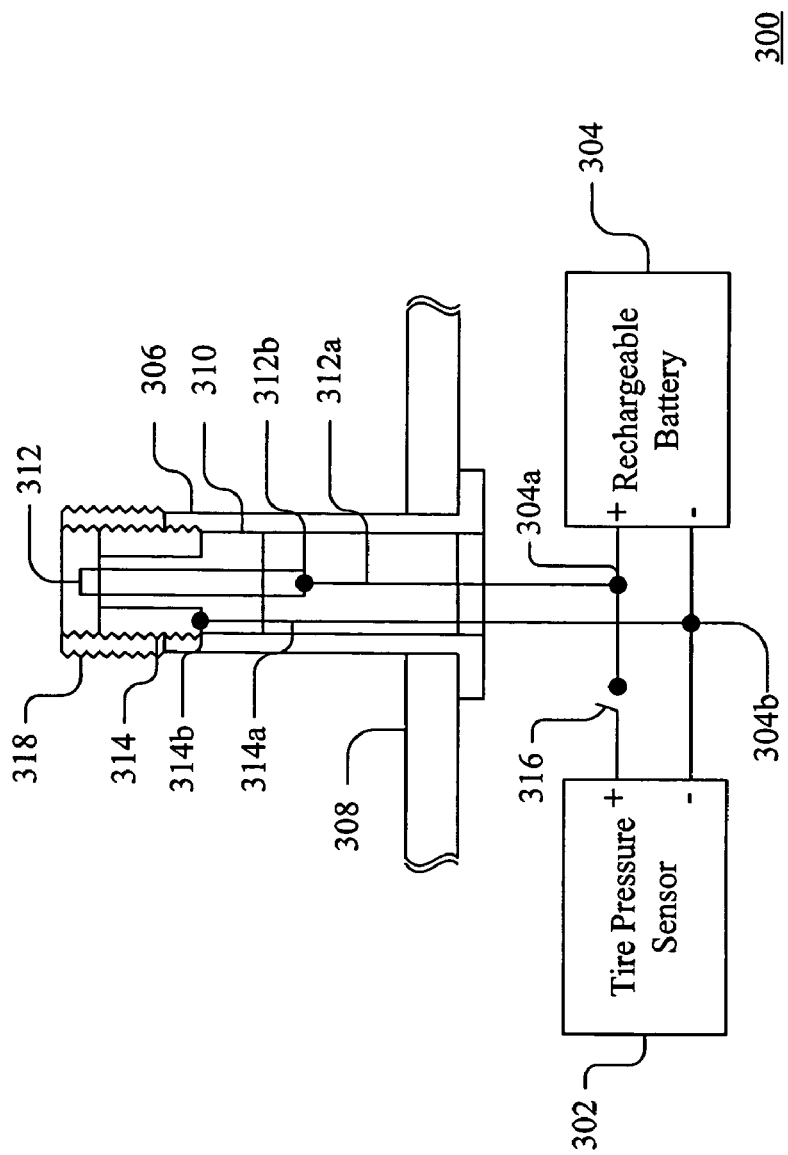
FIG. 3 is block diagram illustrating a valve stem adapted for coupling to the tire pressure sensor battery charging device of FIG. 1 according to an embodiment of the present invention.

FIG. 3 illustrates a tire pressure sensor system 300 that can be coupled to the tire pressure sensor battery charging system 100 of FIG. 1. In FIG. 3, the tire pressure sensor system 300 includes a tire pressure sensor 302, a re-chargeable battery 304, a valve stem 306, and a wheel rim 308. A tire (not shown) can be mounted on the wheel rim 308. The valve stem 306 includes a valve stem assembly 310 and a valve stem threaded connector 318.

In one implementation, the valve stem assembly 310 includes a valve pin or plunger 312, which may serve, for example, as a positive DC electrode, and a valve stem assembly threaded connector 314, which may serve, for example, as a negative DC electrode. The valve stem assembly 310 can be removed from or replaced in the valve stem 306 via the valve stem assembly threaded connector 314 and corresponding threads in the valve stem 306. The valve stem assembly threaded connector 314 may be electrically coupled with the valve stem threaded connector 318. The valve pin or plunger 312 is electrically isolated from the valve stem assembly threaded connector 314 and the valve stem threaded connector 318. The valve stem assembly threaded connector 314 and the valve stem threaded connector 318 may be electrically isolated from the wheel rim 308.

A voltage lead or wire 312a, of a first polarity, e.g. positive, connects the valve pin or plunger 312 to a terminal of the rechargeable battery 304 via removable connectors 312b and 304a. Another voltage lead or wire 314a, of a second polarity, e.g. negative, connects the valve stem assembly threaded connector 314 to the other terminal of the rechargeable battery 304 via removable connectors 314b and 304b. In one embodiment, the connectors 304a and 304b are disposed between a centrifugal switch 316 and the rechargeable battery 304 so as to bypass the centrifugal switch 316 function and allow measurement of a charge of the rechargeable battery 304 without the wheel rim 308 being in rotational motion.

Accordingly, the charging device 108 can be both electrically and mechanically coupled to the valve stem 306 via the valve stem threaded connector 318. For example, the electrode 118 of the charging device 108 is electrically and mechanically coupled to the valve pin or plunger 312, serving as one electrode of the valve assembly 306. Similarly, the electrode 116 of the charging device 108 is electrically and mechanically coupled via the valve stem threaded connector 318 to the valve stem assembly threaded connector 314, serving as the other DC electrode of the valve assembly 306.

In this way, the battery 304 voltage appears across the electrodes 118 and 116 and can be measured when the TEST/CHARGE switch 114 is in the TEST position 114a. Similarly, the DC voltage from the signal lines 104a and 104b can be provided to charge or re-charge the battery 304 via the electrodes 118 and 116 when the TEST/CHARGE switch 114 is in the CHARGE position 114b. Furthermore, the charging device 108 can also test the tire pressure and supply air pressure to the valve stem 306 via the air supply nozzle 120.

Thus, the systems illustrated in FIGS. 1 and 3 provide the ability to charge or re-charge the battery 304 that has been partially or fully depleted. As described above, the battery 304 is electrically coupled to the valve stem 306, and the valve stem 306 is electrically insulated from the wheel rim 308. The charging device 108 may be incorporated into a device that is also used to fill tires with air or check tire pressure. The charging device 108 may also incorporate display devices 110 and 112 for indicating both air pressure and the battery 304 charge level.

Figure 4:
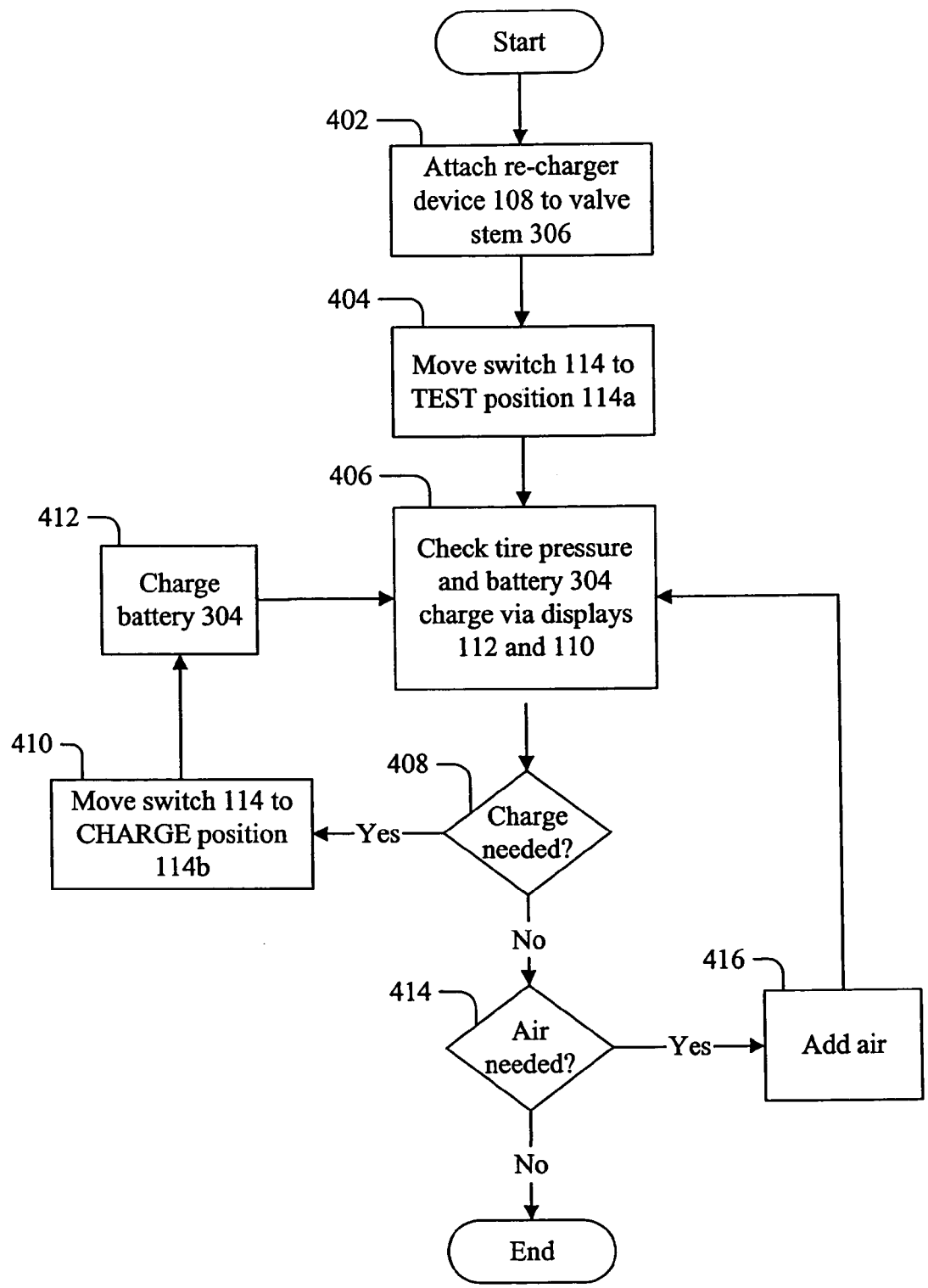
FIG. 4 is flowchart for illustrating a method of charging a battery of a tire pressure sensor disposed in a tire using the battery charging device of FIG. 1 and the valve stem of FIG. 3 according to an embodiment of the present invention.

FIG. 4 illustrates a process for using the battery charging device 108 of FIG. 1 to check the tire pressure and the charge of the battery 304, and, if necessary, to recharge the battery 304. At step 402, a dealer, mechanic, or other user attaches or otherwise applies the battery charging device 108 to the valve stem 306. The TEST/CHARGE switch 114 is then moved to the TEST position 114a (step 404), and, in response, the charging device 108 measures and displays the battery 304 charge level at the display 110 for checking purposes (step 406). In one implementation, the battery charge level is displayed by lighting a number of bars on the bar graph 110b on the battery image 110a corresponding to the level of charge in the battery 304. In addition, the charging device 108 may also display the tire pressure at display 112.

If the battery 304 is to be charged (checked in step 408), the TEST/CHARGE switch 114 is moved to the CHARGE position 114b (step 410). The charging device 108 is left in contact with the valve stem 306 until the battery 304 is charged (step 412). The battery 304 charge may again be checked (step 406). On the other hand, the process proceeds to decision point 414, which if the tire needs air pressure, air is added via the charging device 108 or by another device such as an air hose (step 416), at which point tire pressure may again be checked (step 406). This process may be performed by the dealer, for example, at every service interval of the vehicle, thereby ensuring that the tire sensor battery 304 remains charged as long as the vehicle is being regularly maintained.

Figure 5:
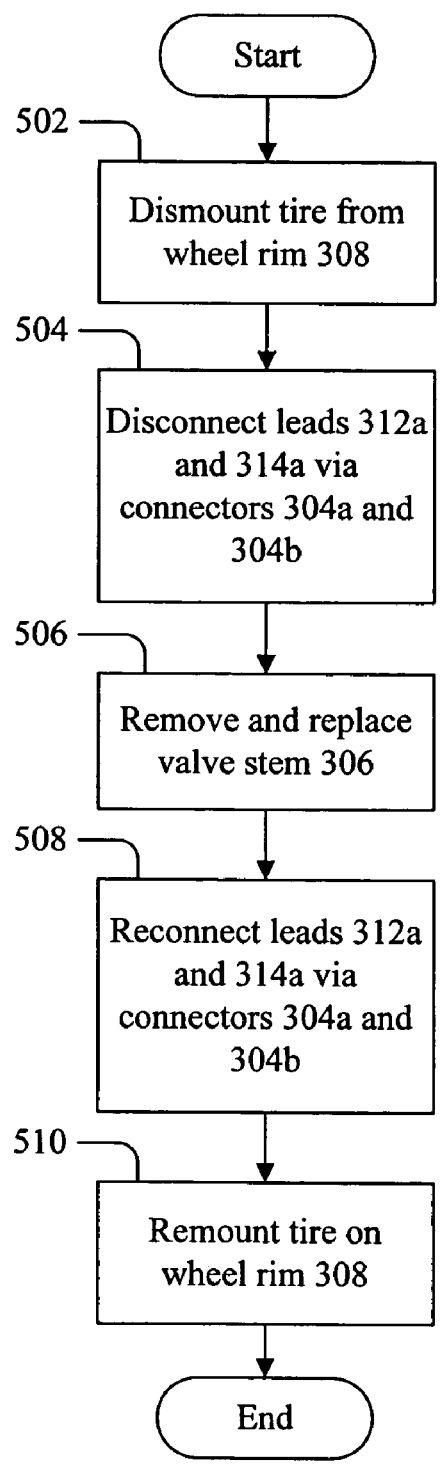
FIG. 5 is flowchart for illustrating a method removing and replacing the valve stem of FIG. 3 according to an embodiment of the present invention.

FIG. 5 shows the operation of removing and replacing the valve stem of 306 of FIG. 3 in accordance with one embodiment of the present invention. The dealer or other user dismounts the tire from the wheel rim 308 (step 502). The leads 312a and 314a are disconnected from the battery 304 using the removable connectors 304a and 304b (step 504). The valve stem 306 may be removed and replaced (step 506). The leads 312a and 314a from the replaced valve stem may be connected to the battery 304 using the removable connectors 304a and 304b (step 508). The tire may be mounted on the wheel rim 308 (step 510) completing the process.

Although the process of FIG. 5 is described in terms of removing and replacing the valve stem 306, the process may be performed in another embodiment by simply removing the valve stem assembly 310 from the valve stem 306 using the valve stem threaded connector 314. In this case, the valve stem assembly 310 is actually removed from the wheel 308. The leads 314a and 312a are disconnected from the removable connectors 314b and 312b of the valve stem threaded connector 314 and the valve pin or plunger 312 of the valve stem assembly 310. The leads 314a and 312a are connected to the removable connectors 314b and 312b of the threaded connector 314 and the valve pin or plunger 312 of the new valve stem assembly 310. The new valve stem assembly 310 may be inserted in the valve stem 306 via the valve stem threaded connector 314 completing the process.

Accordingly, a device and method for extending the life of a tire sensor battery is described that avoids problems associated with other attempts to extend the life of the tire pressure sensor battery. Advantageously, the life of the battery is extended by recharging the batter through the valve stem, which eliminates the necessity for removing the tire from the wheel to physically access the battery. A recharging device can also be used, periodically, to check the charge on the battery to determine whether or not the battery may need to be replaced or simply re-charged. The battery charge can be tested in conjunction with another service item for the vehicle, so that testing of the battery charge need not be forgotten. For example, the battery charge is tested in conjunction with the checking of the tire pressure at a dealership, as checking the tire pressure may be done frequently.

While the present invention has been described in connection with a number of embodiments and implementations, the present invention is not so limited but rather covers various modifications and equivalent arrangements, which fall within the purview of the appended claims.

What is claimed is:

1. A method for replacing a valve stem, comprising:
   disconnecting a first wire lead from a first terminal of a battery, wherein the first wire lead couples a valve pin disposed within the valve stem to the first terminal, and a thread connector of the valve stem is coupled to a second terminal of the battery via a second wire lead; and
   disconnecting the second wire lead from the second terminal.

2. A method according to claim 1, wherein the battery is coupled to a tire pressure sensor.

3. A valve stem apparatus comprising:
   a valve pin coupled to a first terminal of a battery via a first wire lead; and
   a threaded connector coupled to a second terminal of the battery via a second wire lead, wherein the valve stem apparatus is replaced by disconnecting the first wire lead from the first terminal and the second wire lead from the second terminal.

4. A valve stem assembly according to claim 3, wherein the battery is coupled to a tire pressure sensor.

5. A valve stem assembly according to claim 3, further comprising:
   a first removable connector coupled to the first wire lead and to either the valve pin or the first terminal.

6. A valve stem assembly according to claim 5, further comprising:
   a second removable connector coupled to the second wire lead and either to the threaded connector or the second terminal.

7. A valve stem assembly according to claim 3, wherein the battery is disposed between a wheel rim and a mounted tire such that the valve stem assembly is replaceable by disconnecting the first lead from the first terminal and the second lead from the second terminal.

8. A method for replacing a valve stem assembly according to claim 3, wherein the valve stem is replaced without removing the battery.

* * * * *